(12) United States Patent
Huitsing et al.

(10) Patent No.: US 8,654,488 B2
(45) Date of Patent: Feb. 18, 2014

(54) SECONDARY ESD CIRCUIT

(75) Inventors: Albert Jan Huitsing, Nijmegen (NL);
Taede Smedes, Beuningen (NL)

(73) Assignee: NXP B.V., Eindhoven (NL)

(*) Notice: Subject to any disclaimer, the term of this patent is extended or adjusted under 35 U.S.C. 154(b) by 368 days.

(21) Appl. No.: 12/834,597

(22) Filed: Jul. 12, 2010

(65) Prior Publication Data
US 2012/0008243 A1    Jan. 12, 2012

(51) Int. Cl.
*H02H 9/00* (2006.01)
(52) U.S. Cl.
USPC .......................................................... 361/56
(58) Field of Classification Search
None
See application file for complete search history.

(56) References Cited

U.S. PATENT DOCUMENTS

| | | | |
|---|---|---|---|
| 6,621,673 B2* | 9/2003 | Lin et al. ........................ | 361/56 |
| 2008/0158749 A1* | 7/2008 | Kwak et al. .................... | 361/56 |
| 2010/0245342 A1* | 9/2010 | Kawagoe et al. ............. | 345/214 |

OTHER PUBLICATIONS

Huitsing, A.J., Smedes, T. Schroder, H.U., "A Simple Design Methodology for Increased ESD Robustness of CMOS Core Cells", Proc. ESSCIRC, Sep. 16-18, 2003, Estoril Portugal.

* cited by examiner

*Primary Examiner* — Jared Fureman
*Assistant Examiner* — Terrence Willoughby

(57) ABSTRACT

An integrated circuit device provides electrostatic discharge (ESD) protection, as may be applicable to circuits susceptible to ESD in conjunction with, or prior to, activation of a primary ESD circuit for dissipating an ESD. In connection with various example embodiments, primary and secondary ESD circuits discharge electrostatic pulses as may be present at a power input pad, with the secondary ESD circuit separated from the input pad by an impedance circuit. The secondary ESD circuit is configured to actively mitigate an electrostatic pulse present in conjunction with, or before, the activation of the primary ESD circuit, in response to an input voltage level achieving a threshold level. In some implementations, the secondary ESD circuit activates to mitigate some or all of the presentation of an electrostatic pulse to a circuit that competes with the primary ESD circuit, for drawing charge from a common node (e.g., a power supply pad).

15 Claims, 4 Drawing Sheets

SECONDARY ESD CIRCUIT

Various integrated circuits and related semiconductor devices are desirably protected from environmental conditions that can be harmful, including those involving electrostatic discharge (ESD) pulses and related attempts to discharge such pulses using ESD circuits. When developing new circuits, unexpected ESD problems can also adversely affect the development cost.

As one example, in certain electronic circuits, a pad-based protection element such as a low voltage triggering silicon controlled rectifier (LVTSCR) and/or a gate-coupled NMOS transistor (gcNMOST) is used for ESD protection in circuits having several buffers. The pad-based protection has a specific trigger voltage which has to be achieved before it starts conducting current. However, junctions (e.g., NMOST) at the buffers may compete in parallel to primary ESD protection. If the primary ESD protection does not trigger first (e.g., the buffer triggers first, or the buffer and primary ESD trigger simultaneously), circuits can be undesirably exposed to ESD. These issues are also relevant to regulated power domains that are decoupled from primary power supplies (e.g., via active impedance).

These and other matters have presented challenges to ESD circuit protection, and related device operation.

Various example embodiments are directed to electrostatic discharge (ESD) protection for mixed signal devices, including those employing analog circuits that compete with primary ESD protection devices.

In connection with an example embodiment, an integrated circuit device includes a primary electrostatic discharge (ESD) circuit, a secondary ESD circuit and a buffer circuit. The primary ESD circuit is connected between a power supply pad and a ground pad of the integrated circuit device, and configured to couple an ESD pulse from the power supply pad to ground in response to a voltage level at the power supply pad achieving a main trigger voltage level. The buffer circuit is coupled to receive regulated power from the power supply pad and is further susceptible to activation in response to an ESD pulse at which the main trigger voltage level is reached. The secondary ESD circuit is coupled to a node between the buffer circuit and the primary ESD circuit, and includes a field-effect transistor (FET) and a trigger circuit. The FET includes gate, source and drain electrodes, with the source and drain electrodes being connected across the buffer circuit. The trigger circuit is connected to the FET gate and configured to detect electrostatic pulses and, in response to detecting an ESD pulse at a secondary trigger voltage level, to turn on the FET to pass current through the FET and therein limit the voltage drop across the buffer circuit.

Another example embodiment is directed to an electrostatic discharge (ESD) circuit including an impedance circuit and both primary and secondary ESD circuits for protecting mixed-signal circuits from ESD. The primary ESD circuit couples current of an ESD pulse from a power supply pad to ground in response to a voltage level at the power supply pad achieving a primary trigger voltage level. The secondary ESD circuit is connected between the impedance circuit and an input for an analog circuit susceptible to activation in response to an ESD pulse at which the main trigger voltage level is reached. The secondary ESD circuit passes current to limit the voltage drop across the analog circuit in response to detecting an ESD pulse at a secondary trigger voltage level.

In another example embodiment, ESD pulses are discharged in an integrated circuit device including a buffer circuit coupled to receive regulated power from a power supply pad and being susceptible to activation in response to an ESD pulse at which a primary trigger voltage level is reached. In a primary electrostatic discharge (ESD) circuit connected between the power supply pad and a ground pad of the integrated circuit device, an ESD pulse is coupled from the power supply pad to ground in response to a voltage level at the power supply pad achieving a main trigger voltage level. A secondary ESD circuit, which is coupled to a node between the buffer circuit and the primary ESD circuit, is used to detect electrostatic pulses. In response to detecting an ESD pulse at a secondary trigger voltage level, current is passed via the secondary ESD circuit to limit the voltage drop across the buffer circuit.

The above discussion is not intended to describe each embodiment or every implementation of the present disclosure. The figures and following description also exemplify various embodiments.

Various example embodiments may be more completely understood in consideration of the following detailed description in connection with the accompanying drawings, in which.

Figure 1:
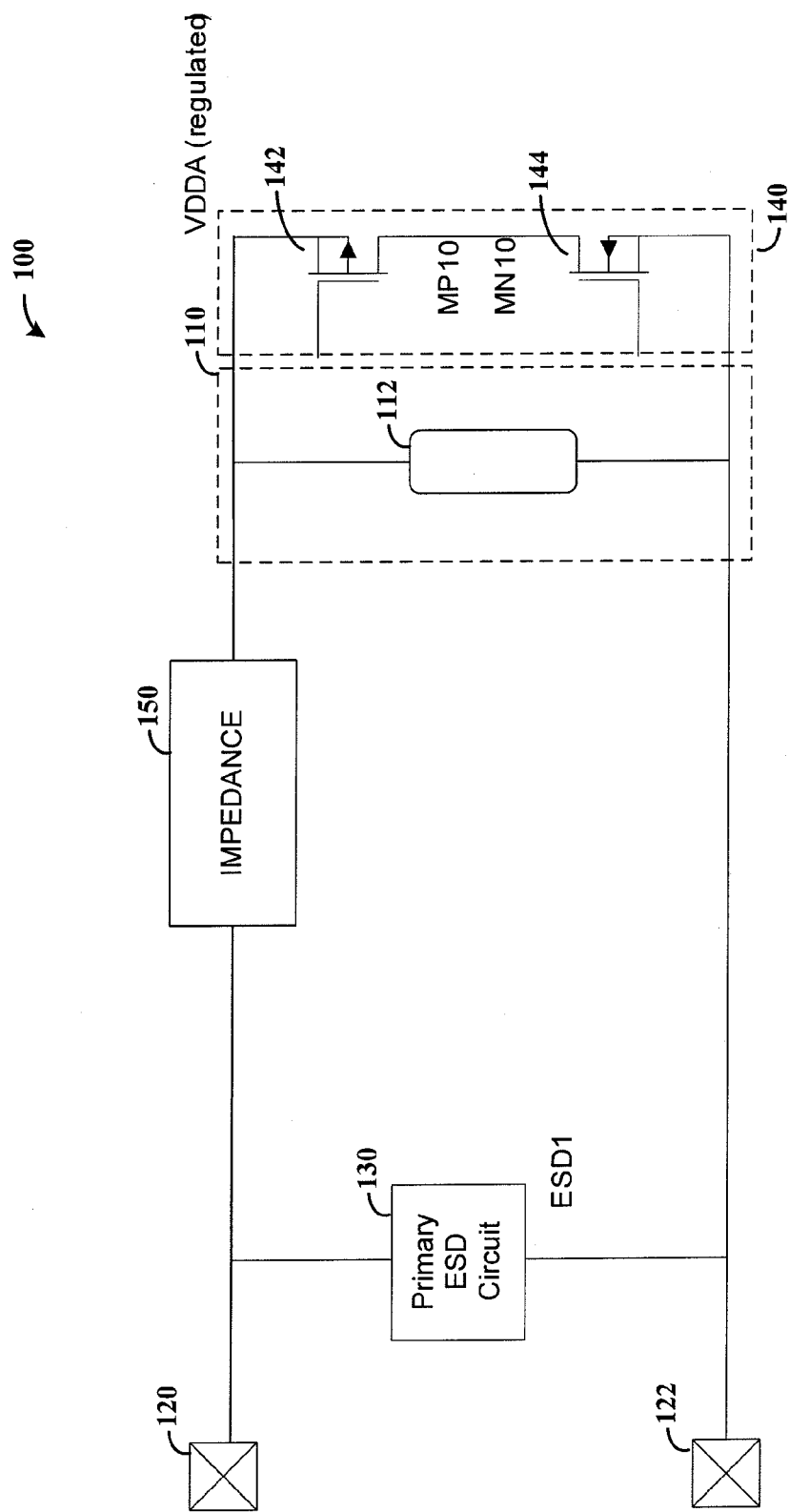
FIG. 1 shows a circuit with secondary ESD protection, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention including aspects defined in the claims.

The present invention is believed to be applicable to a variety of different types of processes, devices and arrangements for use with various circuits, including integrated circuits susceptible to electrostatic discharge (ESD), and related processes. While the present invention is not necessarily so limited, various aspects of the invention may be appreciated through a discussion of examples using this context.

According to an example embodiment, a secondary ESD circuit (e.g., a clamping-type circuit) is configured to provide secondary ESD protection for circuitry, in addition to ESD protection provided via primary ESD protection circuitry. This secondary ESD protection is implemented for one or more circuits, such as those that tend to compete with the primary ESD protection circuitry and are thus susceptible to ESD prior to and/or during activation of the primary ESD protection circuitry. In certain applications, the secondary ESD circuit is an active secondary stage for core circuitry fed a regulated voltage out of primary pad voltage, while the primary ESD protection circuitry functions to protect additional circuits at the primary pad voltage.

In certain embodiments, an ESD clamping circuit is implemented with an analog mixed-signal circuit that uses an unregulated power supply to produce a regulated power. The clamping circuit includes a primary ESD protection circuit coupled between the unregulated power supply and ground, and configured to trigger to dissipate/conduct current from the power supply in response to a voltage level of the power supply exceeding a trigger threshold, to limit current passing through other circuitry supplied by the power supply.

The analog mixed-signal circuit also includes a regulation circuit that regulates voltage from the (unregulated) power supply. A secondary ESD protection circuit is coupled to the regulation circuit and functions to provide secondary ESD protection, in addition to the primary ESD protection circuit, for protecting analog circuits susceptible to receiving ESD presented via the power supply. In this context, the secondary ESD protection circuit may trigger slightly before (e.g., faster) and/or with the triggering of the primary ESD protection circuit, to mitigate or prevent an ESD from reaching one or more of the analog circuits.

In some implementations, as the secondary ESD protection circuit may be coupled between the regulation circuit and analog circuits being protected, it may include a device with faster response time as facilitated by the need to carry less overall current than the primary ESD protection circuit. For instance, where the primary and secondary ESD protection circuits respectively use a field-effect transistor (FET) to pass current of an ESD pulse, the FET in the secondary ESD protection circuit can be smaller than that of the primary ESD circuit due to the regulation of the ESD pulse prior to reaching the secondary ESD circuit's FET. Accordingly, the secondary ESD's FET can be operated with a faster turn-on time, based upon its size, as relative to the primary ESD protection circuit's FET.

In a more particular implementation, an analog circuit includes a regulation circuit that provides a regulated voltage for a VDDA domain, out of a VDDE domain (e.g., via an unregulated power supply pad). The regulation circuit may include, for example, a series of transistors (e.g., three transistors at 5000 µm wide), and a buffer circuit in the VDDA domain. In some embodiments, the VDDA buffer circuit includes an NMOS transistor (NMOST) side made out of one or more NMOST fingers, adjacent a PMOS transistor (PMOST) that is very large.

The VDDE domain (circuits coupled to unregulated VDDE) is protected by a pad-based primary ESD protection circuit, such as a low voltage triggering silicon controlled rectifier (LVTSCR) and/or a gate-coupled NMOS transistor (gcNMOST). The primary ESD protection circuit has a specific trigger voltage which has to be achieved before it conducts current. Upon realizing the trigger voltage (e.g., as may be applicable to an ESD event), the primary ESD protection circuit is activated and discharges current, such as by conducting current from the power supply pad to ground.

A secondary ESD circuit is coupled across the buffer circuit in the VDDA domain, and is configured to shunt an ESD exceeding a secondary trigger threshold, to reduce or prevent threshold-exceeding ESD current from reaching the buffer. Accordingly, the secondary ESD circuit is triggered in connection with or prior to the triggering of the primary ESD circuit. In some implementations, the secondary ESD circuit includes a field-effect transistor (FET) that is triggered (turned on) by a trigger circuit set to provide a turn-on voltage to the FET in response to a voltage at one or more locations in the analog circuit exceeding a threshold. The FET conducts/shunts current away from the buffer circuit to facilitate this secondary ESD protection.

The ESD circuits as discussed herein can be implemented in connection with a variety of integrated circuits, devices and systems. In some implementations, the ESD clamping circuit is implemented with mixed-signal types of circuits, and in other implementations, with circuits having a regulator to feed a separate (regulated) voltage domain relative to a primary domain. Accordingly, various embodiments are directed to one or more of a variety of devices that use mixed-signal circuits, such as a hand-held device, GPS (global positioning) device, GSM (global system for mobile communications) device, automotive-type devices, video processing devices, video display devices, and others.

Turning now to the Figures, FIG. 1 shows an ESD-protected voltage regulation circuit 100 including a secondary local protection clamp circuit 110 having an active ESD discharge device 112, to which various aspects of the claimed invention can be applied. The circuit 100 is powered via an input pad 120 and ground pad 122, and includes a primary ESD protection circuit 130 (ESD1). The circuit 100 also includes a buffer circuit 140, which includes PMOS transistor 142 (MP10) and NMOS transistor 144 (MN10). An impedance circuit 150 is located between the buffer circuit 140 and the input pad 120, and may include regulator devices (e.g., a combination of NMOS and PMOS transistors).

The circuit 100 generates a core voltage VDDA via the impedance circuit 150, out of VDDE as provided via the input pad 120. Although VDDA can be implemented lying completely in the core of the circuit 100, the impedance circuit 150 can be relatively low, and/or may be implemented to effect a capacitive short during an ESD discharge. Under these conditions, the NMOS transistor 144 competes with the primary ESD protection circuit 130 during an ESD event (e.g., the NMOS transistor 144 is susceptible to passing charge between the input pad 120 and ground pad 122). Accordingly, the secondary local protection clamp circuit 110 is used to protect against ESD pulses, including those relating to competition between the buffer circuit 140 and the primary ESD protection circuit 130. During an ESD discharge, the secondary local protection clamp circuit 110 detects an ESD pulse and functions to limit the voltage drop across the transistors 142 and 144 via the active ESD discharge device 112, and mitigate exposure of the buffer circuit 140 to an undesirable charge.

The respective secondary local protection clamp circuit 110, primary ESD protection circuit 130, buffer circuit 140 and regulator circuit 150 can be implemented using one or more of a variety of circuit components, in accordance with various embodiments and related implementations. For instance, in some embodiments, the (main) primary ESD protection circuit 130 includes a CMOS-based circuit having one or more of a diode (chain), grounded-gate NMOS transistor (ggNMOST), gcNMOST, LVTSCR, or FOX device. In accordance with the same and/or other embodiments, the secondary local protection clamp circuit 110 may include a transistor and trigger circuit, with the trigger circuit being configured to apply a voltage to turn on the transistor in response to an ESD at and/or exceeding a threshold trigger level.

Other embodiments involve the use of additional and/or alternate circuits to those shown and/or described above. For example, for general information regarding ESD circuits, and for specific information regarding ESD circuits that can be used in connection with one or more example embodiments and/or to which such embodiments may be applied, reference may be made to "A Simple Design Methodology for Increased ESD Robustness of CMOS Core Cells", A. J. Huitsing, T. Smedes, H.-U. Schröder, Proc. ESSCIRC, 16-18 Sep. 2003, Estoril Portugal, which is fully incorporated herein by reference.

In addition to the above examples, FIG. 1 may also be implemented with other circuitry in place of the buffer circuitry 140. For example, analog circuitry that operates as part of a mixed-signal device, and having one or more circuits susceptible to receiving an ESD pulse as the primary ESD protection circuit 130 is activated, can be protected using the secondary local protection clamp circuit 110. Such a device may, for example, include a device with structure such as an NMOS junction that effectively competes with the primary ESD protection circuit 130 for drawing current during an ESD event.

Figure 2:
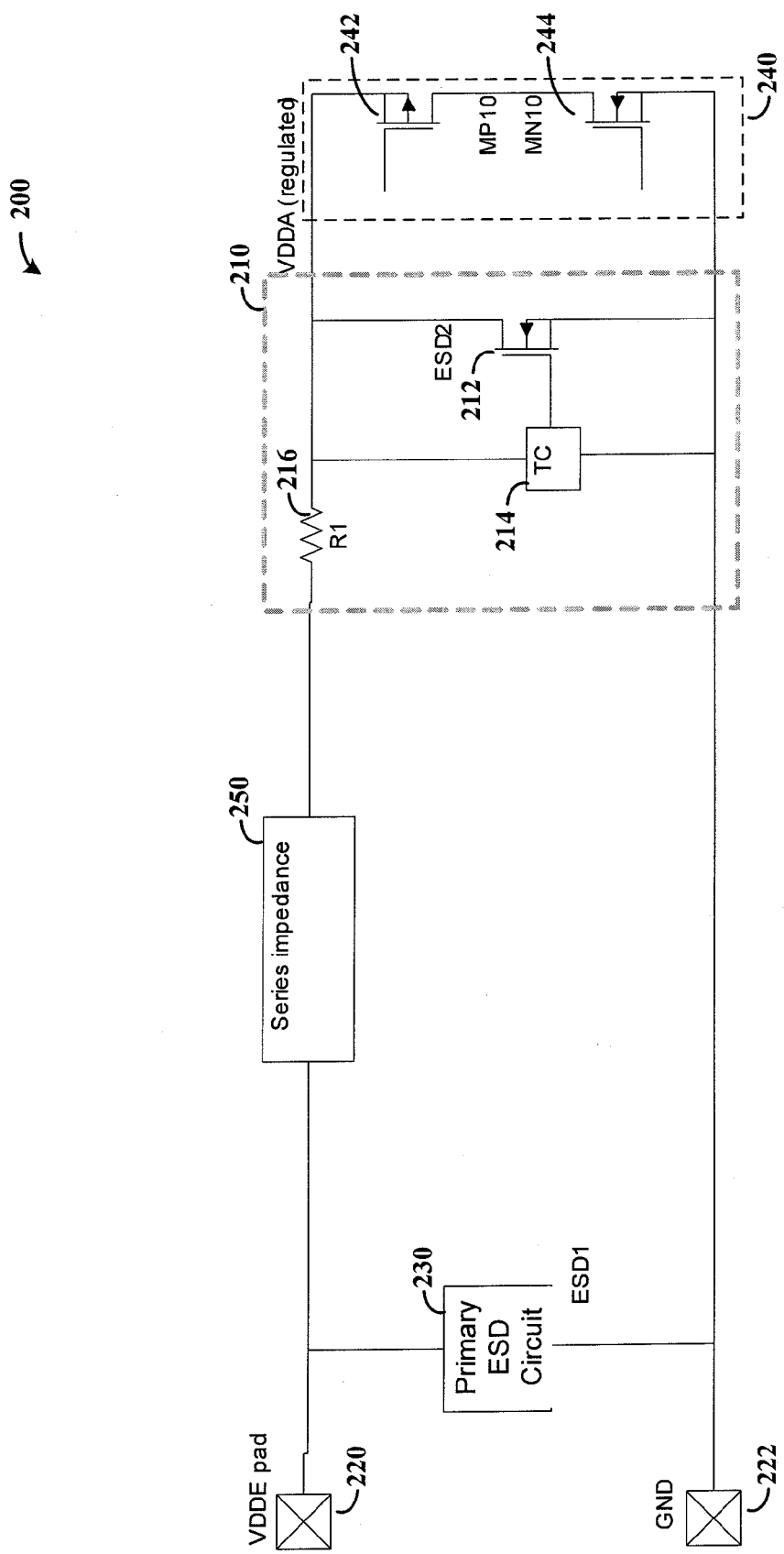
FIG. 2 shows another circuit with secondary ESD protection including a FET, according to an example embodiment of the present invention.

FIG. 2 shows a more particular example embodiment involving an ESD-protected voltage regulation circuit 200 including a secondary ESD circuit 210 that dissipates electrostatic charge during an ESD event through a field-effect transistor (FET) 212, having a size that is set in accordance with expected/desired current conduction during an ESD event for the circuit 200. The circuit 200 is supplied via input pad 220 and ground 222, and uses a primary ESD protection circuit 230. The secondary ESD circuit 210 is coupled between a buffer circuit 240 and series impedance 250 circuit (e.g., a regulator and/or analog switch) that provides a regulated input (VDDA) to the buffer circuit, using the power at the pad 220 (VDDE).

The secondary ESD circuit 210 includes a trigger circuit 214 (TC) configured to apply a voltage to the FET 212 to turn the FET on. A resistor 216 (R1) is optionally connected between the trigger circuit and the series impedance circuit 250. During an ESD discharge, the trigger circuit 214 actively detects an ESD pulse and turns on the FET 212, thus limiting the voltage drop across transistors 242 and 244 of the buffer circuit 240. By limiting the voltage drop in this manner, risks such as those relating to ESD and buffer circuits as discussed in the background above are mitigated and/or eliminated. In connection with this approach, the primary ESD protection circuit 230 is maintained as primary protection in the VDDE domain, while secondary protection in the VDDA domain is afforded to the buffer circuit 240.

As discussed above, the size of the FET 212 can be set in accordance with various applications and needs. In some implementations, the size of FET 212 is determined by SPICE simulation, the general-purpose open-source circuit simulator by Nagel, et al. The series impedance circuit 250 acts as a current limiter to the buffer circuit 240. The resistance of the series resistance circuit 216, if used, can be set based upon the size of the FET 212 (e.g., by adding or subtracting more series resistance, the size of the FET may be reduced or enlarged accordingly), or other circuit conditions.

In other embodiments in which the size of the series resistance circuit 216 and/or the impedance of the series impedance circuit 250 are known, the size of the FET 212 is set using these conditions. Based upon the primary ESD protection circuit 230's maximum holding voltage, the maximum current flowing through the series impedance circuit 250 accessing the secondary ESD circuit 210 can be calculated. This value can be used as a maximum saturation current through the FET 212, and used to determine appropriate impedance for the series impedance circuit 250.

The secondary ESD circuit 210 can be operated relative to the primary ESD protection circuit 230, to protect the buffer circuit 240. In one implementation, the FET 212 conducts ESD current away from the buffer circuit 240 at the initiation of an ESD event, while a voltage builds up over the series impedance/resistance circuit combination 250/216 until a trigger voltage of primary ESD protection circuit 230 is reached. During the full ESD event, both the primary ESD protection circuit 230 and the secondary ESD circuit 210 may conduct current. Other implementations are directed to the activation of the primary ESD protection circuit 230 and the secondary ESD circuit 210 at about the same time, upon the initiation of an ESD event.

Figure 3:
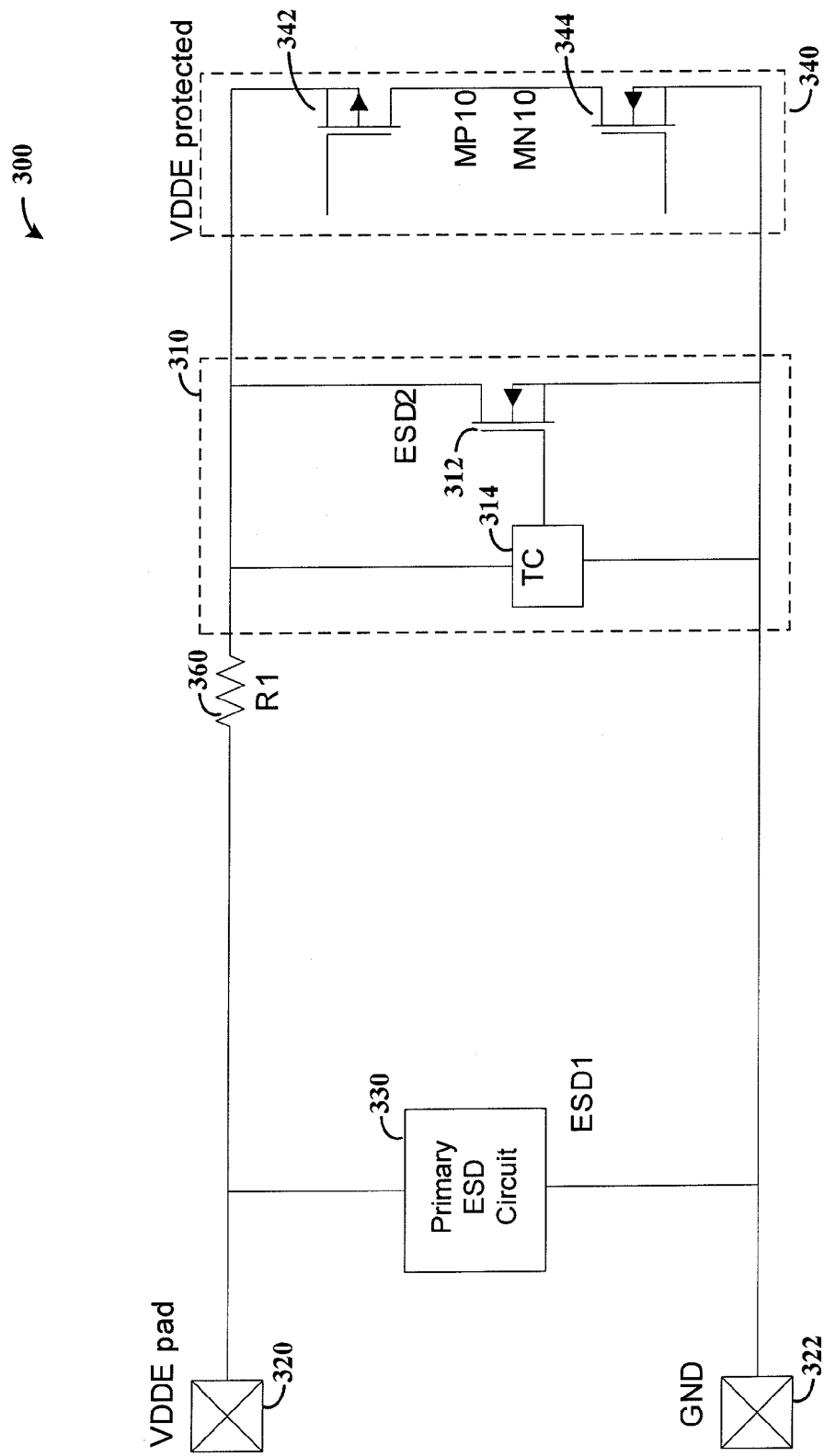
FIG. 3 shows another circuit with secondary ESD protection, according to another example embodiment of the present invention.

FIG. 3 shows an ESD-protected voltage regulation circuit 300 having a secondary ESD protection circuit 310, according to another example embodiment of the present invention. The circuit 300 is similar to the circuit 200 shown in FIG. 2 in certain contexts, having a secondary ESD protection circuit 310 including a FET 312 and a trigger circuit 314 that triggers the FET in response to an ESD condition. The circuit 300 also includes a primary ESD protection circuit 330 coupled across VDDE input pad 320 and ground 322, and a buffer circuit 340 including transistors 342 and 344.

In the circuit 300, FIG. 3 also includes a resistor 360 (R1), which may be optionally omitted and/or replaced with other power-limiting circuitry. The resistor 360 is located between the secondary ESD protection circuit 310 and VDDE input pad 320, to provide reduced/regulated power to the buffer circuit 340. In many implementations, the size of FET 312 is set based upon the size of the resistor circuit 360 (when used), generally as discussed above, to facilitate desirable turn-on of the FET 312 relative to speed and ESD pulse value, to protect the buffer circuit 340.

Figure 4:
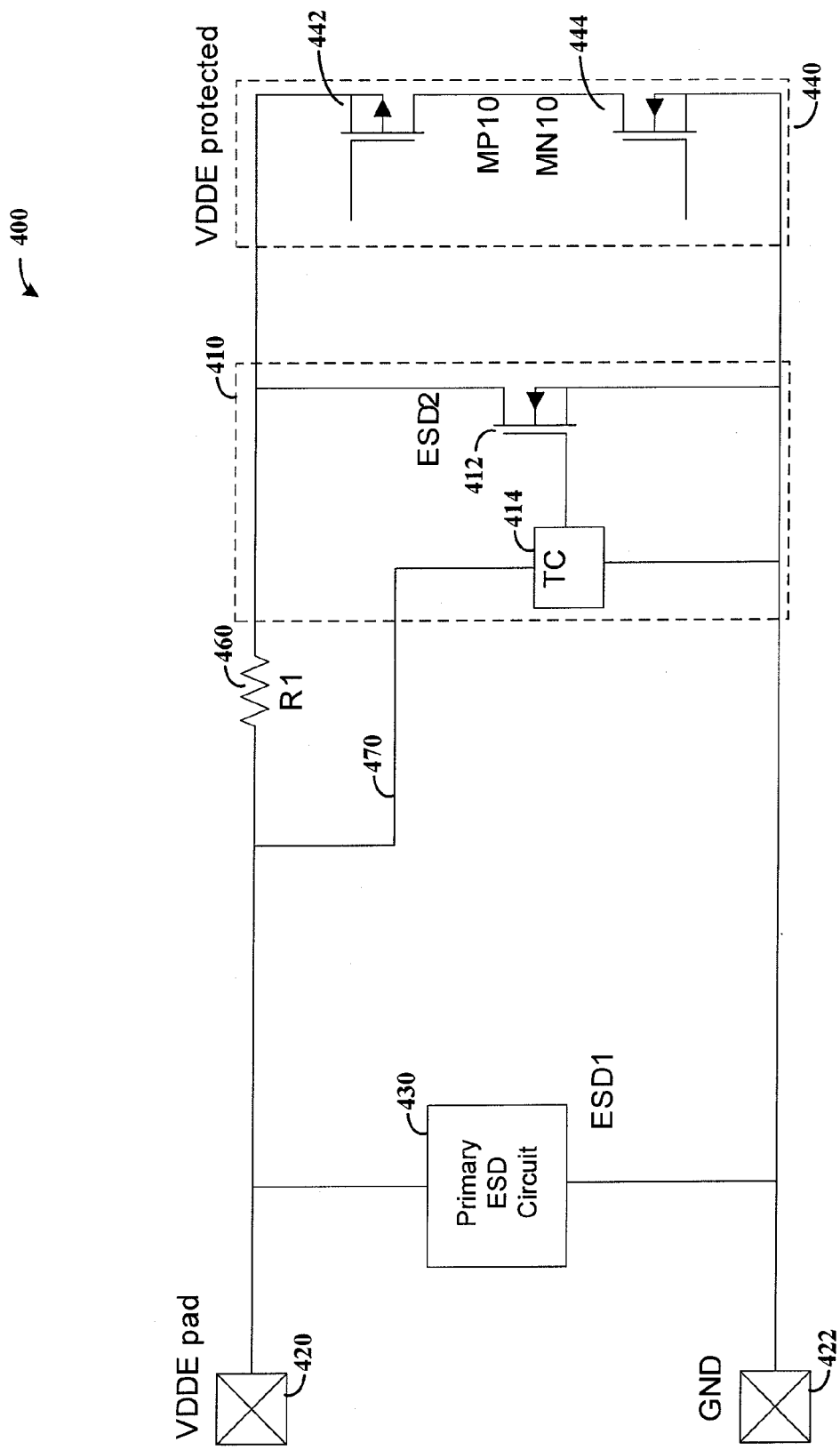
FIG. 4 shows another circuit with secondary ESD protection and directly-connected trigger circuit, according to another example embodiment of the present invention.

FIG. 4 shows another ESD-protected voltage regulation circuit 400 with a secondary ESD protection circuit 410 having a FET 412 and a directly-connected trigger circuit 414, according to another example embodiment of the present invention. The circuit 400 is similar to the circuit 300 shown in FIG. 3, with a primary ESD protection circuit 430 coupled between VDDE pad 420 and ground 422, a buffer circuit 440 including transistors 442 and 444 (e.g., respectively PMOS and NMOS), and a resistor circuit 460 between a VDDE pad 420 and both the buffer circuit 440 and FET 412.

The circuit 400 also includes a trigger circuit-VDDE connector 470 that directly connects the trigger circuit 414 to the VDDE pad 420. The trigger circuit 414, via connector 470, is thus coupled directly to the same electrostatic pulse provided via the VDDE pad, as is the primary ESD protection circuit 430. With this approach, a relatively higher drive may be achieved, boosting the performance of the FET 412. More specifically, by connecting the trigger circuit 414 to voltage at VDDE, before the resistor circuit 460 (and, e.g., before any series impedance), the controlling trigger circuit can operate at a higher level than is presented to the FET 412, facilitating rapid operation of the trigger circuit and rapid turn-on of the FET 412, while also regulating the pulse realized by the FET.

In connection with various example embodiments, aspects shown in the figures separately may be implemented together to suit various applications. For example, the connector 470 between the trigger circuit 414 and VDDE pad 420 in FIG. 4 may be used in connection with trigger circuit 214 in FIG. 2, or generally with the secondary ESD protection circuit 110 in FIG. 1. For instance, the connector 470 can be implemented in connection with the circuit 100 in FIG. 1 or with the circuit 200 in FIG. 2, with connectivity directly to the VDDE pad and/or between series impedance and resistance circuits (FIG. 2). Similarly, additional resistance and/or impedance circuits may be added between connected devices as shown, such as between the secondary ESD protection circuits and one or more of the input power supply pads, series impedance and buffer circuit.

Based upon the above discussion and illustrations, those skilled in the art will readily recognize that various modifications and changes may be made to the present invention without strictly following the exemplary embodiments and applications illustrated and described herein. For example, different types of regulator or buffer circuits may be implemented. Such modifications do not depart from the true spirit and scope of the present invention, including that set forth in the following claims.

What is claimed is:

1. An integrated circuit device comprising:
a primary electrostatic discharge (ESD) circuit connected between a power supply pad and a ground pad of the integrated circuit device, and configured to couple an ESD pulse from the power supply pad to ground in response to a voltage level at the power supply pad achieving a main trigger voltage level;
a buffer circuit coupled and configured and arranged to receive regulated power from the power supply pad and being susceptible to activation in response to an ESD pulse at which the main trigger voltage level is reached; and
a secondary ESD circuit coupled to a node between the buffer circuit and the primary ESD circuit, the secondary ESD circuit including
a field-effect transistor (FET) including gate, source and drain electrodes, the source and drain electrodes being connected respectively at first and second nodes across the buffer circuit, with the first and second nodes configured and arranged to provide regulated power, relative to the power supply pad and ground pad, to the buffer circuit, and
a trigger circuit connected to the FET gate, the trigger circuit being configured to detect electrostatic pulses and, in response to detecting an ESD pulse at a secondary trigger voltage level, to turn on the FET to pass current through the FET and limit a voltage drop across the buffer circuit.

2. The device of claim 1,
further including an impedance circuit connected between the buffer circuit and the power supply pad and configured to limit current reaching the buffer circuit from the power supply pad, and
wherein the trigger circuit is connected to the power supply pad for detecting the electrostatic pulse directly from the power supply pad, bypassing the impedance circuit, and the FET is connected to a node between the impedance circuit and the buffer circuit.

3. The device of claim 1,
further including an impedance circuit connected between the buffer circuit and the power supply pad, and
wherein the trigger circuit is connected to a node between the impedance circuit and the buffer circuit for detecting the electrostatic pulse, and the FET is also connected to a node between the impedance circuit and the buffer circuit.

4. The device of claim 1, further including an impedance circuit connected between the buffer circuit and the power supply pad, wherein the buffer circuit includes an NMOS device having a junction that competes for passing current with the primary ESD circuit.

5. The device of claim 1, wherein the trigger circuit is connected to the power supply pad to detect the electrostatic pulses, and the secondary ESD circuit is coupled across the buffer circuit in a regulated voltage domain.

6. The device of claim 1, further including an analog switch connected between the buffer circuit and the power supply pad, and an impedance circuit to provide the regulated power to the buffer circuit using unregulated power at the power supply pad.

7. The device of claim 1, further including a resistor connected between the buffer and the power supply pad.

8. The device of claim 1,
further including a resistor connected between the buffer and the power supply pad, and
wherein the trigger circuit is connected to the power supply pad for detecting the electrostatic pulse directly from the power supply pad, bypassing the resistor, and the FET is connected to a node between the resistor and the buffer.

9. The device of claim 1,
further including a resistor connected between the buffer and the power supply pad, and
wherein the trigger circuit is connected to a node between the resistor and the buffer circuit for detecting the electrostatic pulse, and the FET is connected to a node between the resistor and the buffer.

10. An integrated circuit device comprising:
a primary electrostatic discharge (ESD) circuit connected between a power supply pad and a ground pad of the integrated circuit device, and configured to couple an ESD pulse from the power supply pad to ground in response to a voltage level at the power supply pad achieving a main trigger voltage level;
a buffer circuit coupled and configured and arranged to receive regulated power from the power supply pad and being susceptible to activation in response to an ESD pulse at which the main trigger voltage level is reached;
a secondary ESD circuit coupled to a node between the buffer circuit and the primary ESD circuit, the secondary ESD circuit including
a field-effect transistor (FET) including gate, source and drain electrodes, the source and drain electrodes being connected, and
a trigger circuit connected to the FET gate, the trigger circuit being configured to detect electrostatic pulses and, in response to detecting an ESD pulse at a secondary trigger voltage level, to turn on the FET to pass current through the FET and limit a voltage drop across the buffer circuit;
an impedance circuit connected between the buffer circuit and the power supply pad; and
a resistor connected between the buffer and the impedance circuit.

11. The device of claim 10,
wherein the trigger circuit is connected to a node between the resistor and the buffer.

12. The device of claim 1,
further including an impedance circuit connected between the buffer circuit and the power supply pad,
further including a resistor connected between the buffer and the impedance circuit,
wherein the trigger circuit is connected to the power supply pad for detecting the electrostatic pulse directly from the power supply pad, bypassing the resistor and the impedance circuit, and
wherein the FET is connected between the impedance circuit and the buffer circuit.

13. The device of claim 1,
further including an impedance circuit connected between the buffer circuit and the power supply pad and configured to limit current presented to the buffer circuit, relative to current presented to the primary ESD circuit,
wherein the primary ESD circuit includes a primary FET that is configured to pass more current than the FET of the secondary ESD circuit,
wherein the FET of the secondary ESD circuit is connected between the impedance circuit and the buffer circuit, and
wherein the secondary ESD circuit is configured to turn on and pass current via the secondary ESD circuit's FET in response to an ESD pulse at the secondary trigger voltage level, faster than the primary FET turns on in response to the voltage level at the power supply achieving the main trigger level.

14. The device of claim 1, wherein the main trigger level and the secondary trigger voltage level are the same.

15. The device of claim 1, wherein the secondary trigger voltage level is less the than main trigger voltage level.

* * * * *